United States Patent [19]
Nye

[11] 3,727,341
[45] Apr. 17, 1973

[54] DEPTH CONTROL DEVICE

[76] Inventor: Norman H. Nye, 1348 Highbridge Road, Cuyahoga Falls, Ohio 44223

[22] Filed: Jan. 18, 1972

[21] Appl. No.: 218,713

[52] U.S. Cl. ............................... 43/43.13, 43/42.22
[51] Int. Cl. .............................................. A01k 85/00
[58] Field of Search ...................... 43/42.12, 42.22, 43/42.03, 43.13, 42.2, 42.21, 4

[56] References Cited

UNITED STATES PATENTS

| | | | |
|---|---|---|---|
| 576,680 | 2/1897 | Kittle | 43/42.12 |
| 2,665,512 | 1/1954 | Sullivan et al. | 43/43.13 |
| 2,679,227 | 5/1954 | Symonds | 43/42.22 |
| 2,789,386 | 4/1957 | Creelman | 43/43.13 |
| 3,305,964 | 2/1967 | Wieszeck | 43/42.03 |

*Primary Examiner*—Louis G. Mancene
*Attorney*—Vern L. Oldham et al.

[57] ABSTRACT

A device which is attached to a fishing line to bring the lure to the desired temperature level. The device has an elongated body with a slanted front end and angled fins at the rear end. The body is mounted to a keel so that the body can rotate about its longitudinal axis. A latch member which is controlled by a bimetallic element holds the body in non-rotating relation with the keel until a sufficient change in water temperature is encountered. At this time the latch shifts to its opposite position permitting 180° rotation of the body so that the slanted forward end thereof will cause the device to move upwardly or downwardly toward the desired temperature zone. A line connects the forward end of the keel to the fishing rod and a second line connects the rear end of the keel to the lure.

14 Claims, 10 Drawing Figures

3,727,341

DEPTH CONTROL DEVICE

This invention relates to a depth control device and, more particularly, to a device for use with a fishing lure for automatically bringing the lure to the desired water temperature zone within a body of water.

It is well known that fish prefer certain temperatures of water and, in a deep body of water, will seek the particular level at which the temperature is to their liking. While thermometers can be used to determine the water temperature at various levels, a trial and error procedure must be used to get the fishing lure to the desired level. This can be a difficult task since a number of factors including the weight and construction of the lure, the length of line, and the speed of the boat all affect the depth of the lure.

It is the primary object of the present invention to provide a depth device which may be attached to the line to bring the fishing lure to a predetermined temperature level at which the type of fish being sought are known to frequent.

It is a further object of the invention to provide such a device which will automatically seek the desired temperature level and which having found the desired level, will attempt to remain at that level.

Yet another object of the invention is the provision of a depth control device for use on a fishing line which may be adjusted to seek different temperature levels when fishing for different types of fish.

A further object of the invention is the provision of such a device which is of rugged construction to provide reliable operation.

The present invention achieves the above and other objects by providing a device which is attached to a fishing line and which has an elongated body portion having an inclined forward end to direct the device upwardly or downwardly, fins at the rear of the body tending to rotate the body about its longitudinal axis as it moves through the water, a keel, a rod connecting the body to the keel and permitting the body to rotate about its longitudinal axis, and a bimetallic controlled latching device for controlling the rotation of the body relative to the keel so that the inclined upper end is so oriented that the device moves toward the desired temperature range in the body of water.

For a more complete understanding of the invention and the objects and advantages thereof reference should be had to the following detailed description and the accompanying drawings wherein there is shown a preferred embodiment of the invention.

Figure 1:
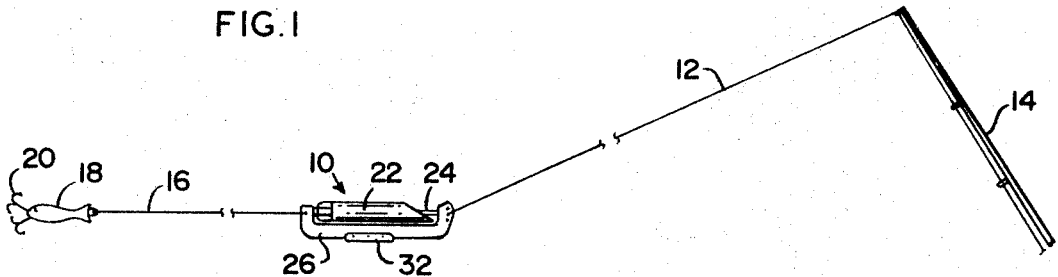
FIG. 1 is a schematic showing of the device of the present invention attached to a fishing line.
Figure 2:
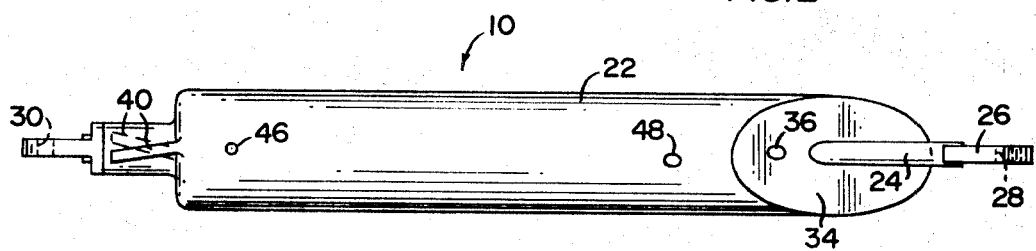
FIG. 2 is a plan view of the depth control device of FIG. 1.

As will be seen from FIG. 1, the device 10 is attached at its forward end to a line 12 which extends to the rod 14 and at its rear end to a second line 16 which is connected to the lure 18, the lure being provided with hooks 20 in the conventional manner. As illustrated, the device 10 is oriented to move the lure 18 deeper into the body of water, the forward end of the tubular portion of the device being inclined upwardly so that the device is forced downwardly as it moves forward through the water. As will become clear below, when the device has reached the lower limit of the desired temperature range the tubular body portion will rotate 180° so that the inclined forward end now directs the device upwardly.

The device 10 is illustrated in greater detail in FIG. 2–5. A hollow tubular body member 22 is supported on its longitudinal axis by a rod 24. The opposite ends of the rod 24 are carried by upwardly projecting portions of a keel plate 26 which has a plurality of holes 28 at its forward end to provide connection points for the line 12 and at least one hole 30 at its rear end to provide a connection for the line 16. A lead weight 32 is provided on the lower surface of the keel 26 to keep the keel oriented in a vertical plane. It will be understood that the tubular body 22 is capable of rotating about its longitudinal axis, the body rotating about the rod 24 or, alternatively, the rod 24 being rotatably carried in the end portions of the keel plate 26. The forward end 34 of the tubular body 22 is inclined to provide a surface which is angled relative to the longitudinal axis of the device and which serves to direct the device upwardly or downwardly as it moves through the water. A number of fins 40 are provided on the rear end of the tubular body, the fins being angled slightly to the longitudinal axis of the device and all of the fins having the same angular direction so that they tend to rotate the body 22 relative to the keel 26. One or more openings 36 are provided on the inclined forward face 34 of the body member 22 and openings 38 are provided at the rear end of the body so that water may flow through the hollow interior. A bimetallic element 44, wound in a helical coil, is connected at one end to the body 22, for example by the rivets 46. The opposite end of the bimetallic element 44 is connected to a latching member 48 which, as can be seen most clearly in FIG. 4, projects through two openings 50 and 52 located 180° from one another in the cylindrical wall of the body member 22. The latching member 48 is of such length that one or the other of the end portions 54 or 56 projects beyond the outer surface of the tubular member 22, the projecting end extending sufficiently far to encounter the keel plate 26. The center portion of the latching member 48 may be curved to provide clearance for the rod 24 and includes a pin 58 which connects the latching member 48 to the free end of the bimetallic element 44.

Figure 3:
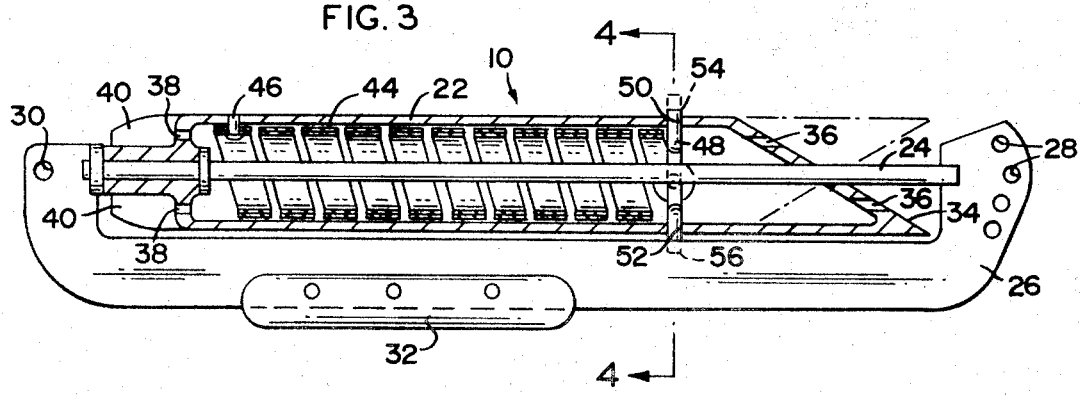
FIG. 3 is a longitudinal cross sectional view of the device of FIG. 2.
Figure 4:
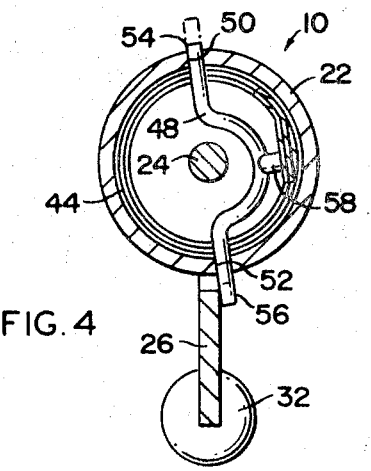
FIG. 4 is a transverse sectional view taken along the line 4—4 of FIG. 3.
Figure 5:
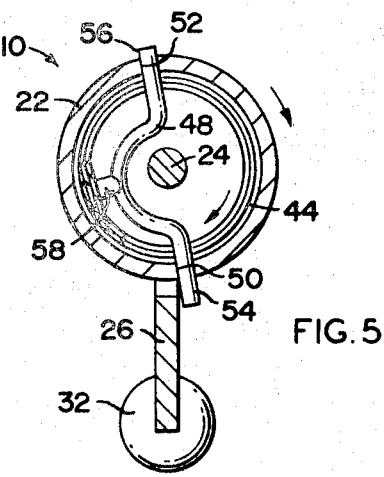
FIG. 5 is a view similar to that of FIG. 4 but showing the device after the desired temperature range has been reached.

FIGS. 3 and 4 illustrate the position of the device when located in water warmer than that desired. In this position the end 56 of the latching member 48 projects from the tubular member 22 and contacts the keel plate 26. The fins 40 cause rotation of the tubular body 22 in the counterclockwise direction, when viewed as in FIG. 4, so that the forward inclined surface 34 of the body 22 is oriented as is shown in solid outline in FIG. 3. In this position the upwardly inclined surface 34 will serve to move the device downwardly as it advances through the water. When the desired water temperature is encountered, the bimetallic element will shift sufficiently to bring the end 54 of the latching member 48 outwardly, to the dotted position shown in FIG. 4. The opposite end 56 of the latch mechanism has now moved free of the keel plate 26 and the rotating action caused by the angled fins 40 causes the body portion 22 to rotate 180° in the counterclockwise direction bringing the inclined forward surface 34 to the position shown in dotted outline in FIG. 3. Since the forward surface 34 is now downwardly inclined, the device will tend to move upwardly as it is advanced through the water. Obviously, when the upper limit of the desired temperature range is encountered shifting of the latching member 48 will again result and the device will rotate an additional 180° so that it is again directed downwardly. It should be understood that the fins are angled so that they exert sufficient force to cause rotation of the tubular member 22 but do not exert sufficient force to cause rotation of the entire assembly 10, the keel plate 26 and the lead weight 32 opposing the rotation of the device beyond that permitted by the latching member 48.

When the device first reaches the lower limit of the desired temperature range and the body portion 22 rotates so that the device begins to move upwardly a considerable decrease in drag on the line may be noted, indicating to the fisherman that the desired temperature zone has been reached. As long as periodic variation in drag on the line is detected, resulting from the oscillation of the device between the upper and lower temperature limits, the fisherman knows that he is within the desired range. If this periodic variation in drag is not detected the fisherman can take suitable action to correct the depth of the device and the lure such as lengthening of his line, slowing down of the boat, etc.

Figure 6:
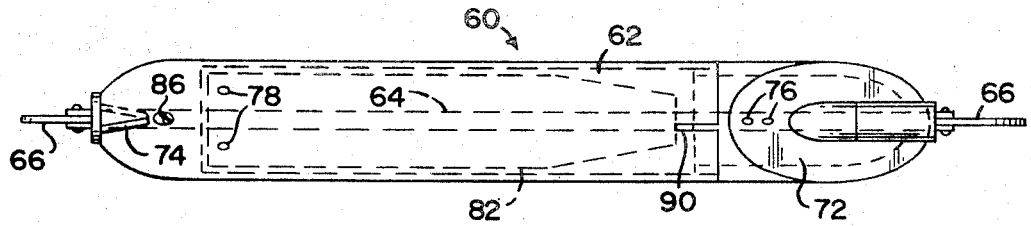
FIG. 6 is a plan view of a second embodiment of my invention.
Figure 7:
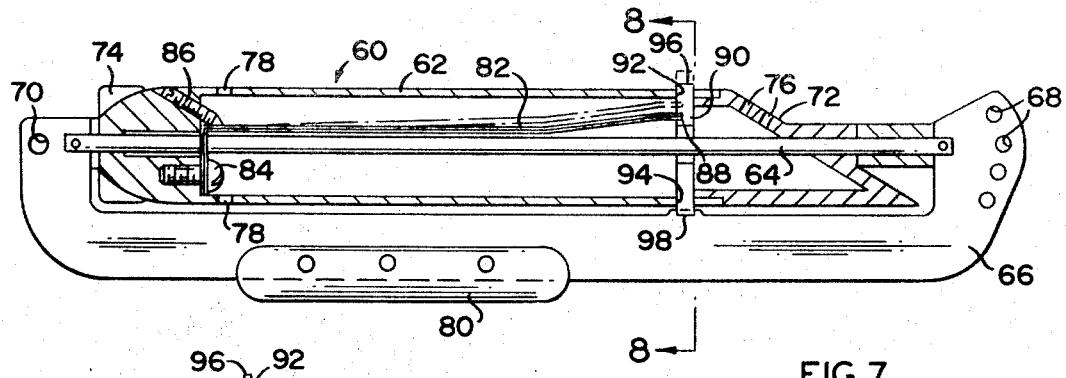
FIG. 7 is a longitudinal cross sectional view of the device of FIG. 6.
Figure 8:
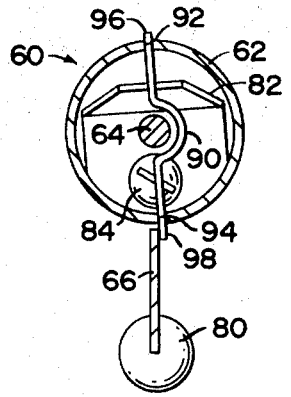
FIG. 8 is a transverse sectional view taken along the line 8—8 of FIG. 7.

A second embodiment of the invention is illustrated in FIGS. 6–8. This embodiment 60 is also provided with a tubular body portion 62 carried on a rod 64 extending through the longitudinal axis of the body 62 and connected at its opposite ends to the end portions of a steel plate 66. The holes 68 and 70 are provided on opposite ends of the keel for attachment to the line extending to the keel and the line extending to the lure, respectively. The body 62 is again mounted for rotation about its longitudinal axis. The forward end of the body 62 is inclined as indicated at 72 to provide a ramp surface which directs the body upwardly or downwardly through the water, depending upon the orientation of the body and vanes 74 are provided at the rear end of the body 62 to rotate the body. Again, the vanes 74 are angled so that they exert sufficient force to permit rotation of the body when the latching member, to be described below, is free but do not cause rotation of the body and the keel together. Openings 76 are provided in the inclined forward surface 72 of the body 62 to permit water to flow into the interior of the body and exhaust openings 78 are provided at the opposite end of the body so that the water may flow through the interior. A lead weight 80 is provided on the lower edge of the keel to keep the keel oriented in a downward position.

A bimetallic strip 82 is located within the body 62, being connected at the rear of the body by a screw or other suitable fastener 84. An adjusting screw 86 which is threaded through the rear portion of the body also engages the bimetallic element 82. The forward end of the element is connected to a latching member 90, the member being received within a notch 88 at the free end of the bimetallic element 82. As in the previous embodiment, the latching element projects through two openings 92 and 94 located on diametrically opposite sides of the tubular body 62 and the element 90 is of such length that one or the other of the end portions 96 and 98 thereof projects from the body to encounter the keel plate 66.

The operation of the device 60 is identical to that for the device 10 described above, that is, the inclined surface 72 is oriented as shown in FIG. 7 as long as the device is in warmer than desired waters so that the upwardly inclined surface 72 causes the device to move downwardly. When the desired water temperature is encountered the bimetallic element 82 shifts sufficiently to move the end 98 of the latching plate clear of the keel plate 66 while bringing the opposite end 96 of the latching plate outwardly. The body member 62 now rotates due to the action of the fins 74 until the end 96 encounters the keel. By adjustment of screw 86 the operating range of the bimetallic element 82 may be varied so that the device may be easily adjusted for fishing at different temperature levels.

Figure 9:
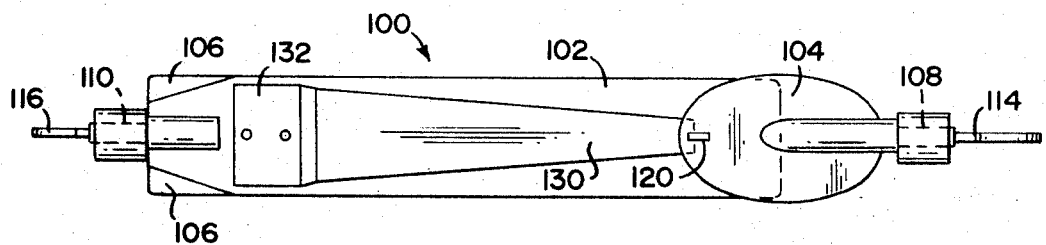
FIG. 9 is a plan view of a third embodiment of the depth control device of my invention.
Figure 10:
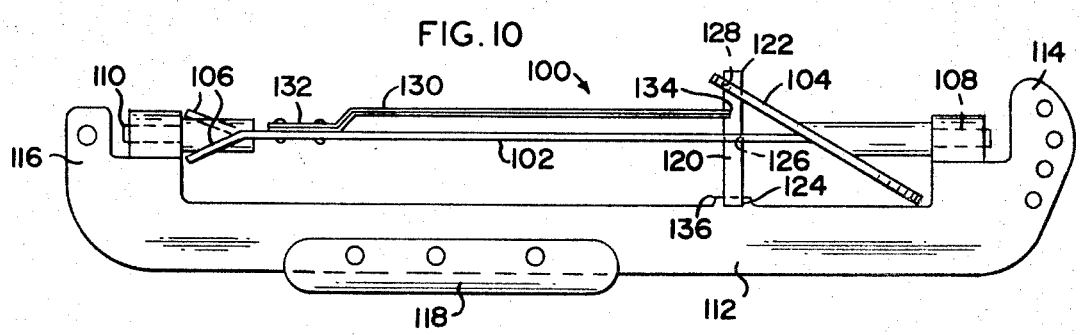
FIG. 10 is a side elevational view of the device of FIG. 9.

A further modification of the depth control device of my invention is shown IN FIGS. 9 and 10. The device of this embodiment, designated generally by the reference numeral 100, is provided with an elongated flat body portion 102 which is provided at its forward end with a plate 104 inclined relative to the longitudinal axis of the body plate 102 and at its rear end with a pair of fins 106 which, when the device is moved through the water, tend to rotate the body portion 102. Rods 108 and 110 project from opposite ends of the body plate 102 and are aligned with the longitudinal axis thereof. These rods 108 and 110 are journaled in a keel plate 112, upwardly projecting ends 114 and 116 being provided on the keel plate for receiving the rods 108 and 110, respectively, as well as providing attachment points for the line from the fishing rod and the line from the lure or other hook. A suitable weight 118 may be provided along the lower edge of the keel plate 112 to maintain the plate in the vertical position.

As in the previous embodiments, a latching member 120 is provided to control rotation of the body 102 relative to the keel plate 112 so that the inclined plate 104 is oriented either upwardly or downwardly to direct the device toward a higher or lower level within the body of water. The latching plate has opposite ends 122 and 124, one of which engages the keel plate to prevent rotation of the body member 102. The latching plate 120 is slidably received in an opening 126 in the body plate 102 and in an opening 128 in the inclined plate 104 and entends perpendicular to the longitudinal axis of the body member 102. A bimetallic strip 130 is connected at one end to the body plate 102, adjacent the rear end thereof, as indicated by the reference numeral 132. The opposite or free end of the bimetallic strip 130 engages a notch 134 in the latching plate 120 so that the plate 120 will move upwardly or downwardly as the bimetallic strip 130 encounters different temperature conditions. It will be noted that a small upwardly projecting lug 136 may be provided on the upper edge of the main portion of the keel plate 112 to engage the end 122 or 124 of the latching plate 120. Obviously, the width of the body plate 102 and the inclined plate 104 are such that the plates 102 and 104 can rotate without contacting the keel plate 112.

Of course the bimetallic elements used are selected to be responsive to the general temperature variations in water temperature usually encountered in use in a particular area. Further, adjustments in the operating temperature range of the bimetallic element can be obtained by the screw 86 as shown in FIG. 7.

While only the best known embodiments of the invention have been illustrated and described in detail herein it will be understood that the invention is not limited thereto or thereby but that various changes, additions, and modifications may be made without departing from the spirit of the invention. Reference should therefore be had to the appended claims in determining the true scope of the invention.

What is claimed is:

1. A device adapted to be connected to a fishing line for positioning a lure at a preselected temperature zone in a body of water, comprising:
   an elongated member one end of which is slanted relative to the longitudinal axis of the member;
   a keel plate having a center portion extending parallel to the longitudinal axis of the member and closely adjacent the outer surface of the member and end portions projecting upwardly from opposite ends of the center portion, the fishing line being connected to the end portion adjacent the slanted end of the cylindrical member and the lure being connected to the other end portion;
   means connecting the member to the end portions of the keel plate, the means permitting rotation of the member about its longitudinal axis;
   at least one fin projecting outwardly from and angled relative to the longitudinal axis of the member; and
   temperature responsive latching means operative to prevent rotation of the member relative to the keel plate.

2. The device according to claim 1 wherein the latching means comprises a latching bar projecting from the member and movable between a first position in which the end of the bar clears the keel plate upon rotation of the member and a second position in which the bar contacts the keel plate upon rotation of the member and a bimetallic element connected to the bar for shifting the bar between the first and second positions upon temperature changes.

3. The device according to claim 2 wherein the latching bar has a second end projecting from the member at a point diametrically opposite the first end, the second end projecting sufficiently to contact the keel plate when the first end clears the keel plate and vice versa.

4. The device according to claim 3 wherein the latching bar is oriented so that the slanted end of the member is inclined upwardly when the bar is in its first position.

5. The device according to claim 4 wherein the bimetallic element is a helical coil.

6. The device according to claim 4 wherein the bimetallic element is a substantially flat strip.

7. The device according to claim 4 wherein the member is a hollow cylindrical member, the bimetallic element being located within the member and having its first end connected to the member and its second end connected to the latching bar.

8. The device according to claim 7 further including an adjustment screw threaded through the cylindrical member and contacting the bimetallic element adjacent the first end thereof.

9. The device according to claim 7 wherein at least one inlet opening is provided in the slanted end of the cylindrical member and at least one outlet is provided in the opposite end of the member.

10. A device adapted to be connected to a fishing line for positioning a lure at a preselected temperature zone in a body of water, comprising:
    an elongated member one end of which is angled relative to the longitudinal axis of the member, the opposite end having a plurality of fins projecting outwardly and angled to cause rotation of the member as the member is moved through the water;
    a keel having end portions which project upwardly adjacent opposite ends of the member and a center portion extending the length of the member;
    means connecting the member to the end portions of the keel, the means permitting the member to rotate about its longitudinal axis; and
    temperature responsive latching means carried by the member and having a latching bar projecting outwardly from the member, the latching bar being movable in response to temperature changes between a first position clear of the keel and a second position contacting the keel, the bar being so located that the angled end of the member is inclined upwardly or downwardly when the latching bar is in its second position.

11. The device according to claim 10 further including a weight affixed to the center portion of the keel along the lower edge thereof.

12. The device according to claim 10 wherein the latching bar has first and second ends which project from diametrically opposite points of the member, the first end being in the first position when the second end is in the second position and vice versa.

13. The device according to claim 12 wherein the latching means includes a bimetallic element connected at one end to the member and at its opposite end to the latching bar.

14. The device according to claim 10 wherein the elongated number has a flat main portion extending parallel to the longitudinal axis of the member and an inclined forward portion forming the angled end of the member.

* * * * *